United States Patent
Park et al.

(10) Patent No.: US 9,046,986 B2
(45) Date of Patent: Jun. 2, 2015

(54) METHOD AND MOBILE DEVICE FOR DISPLAYING SUPPLEMENTARY WINDOW

(71) Applicant: Samsung Electronics Co., Ltd., Gyeonggi-do (KR)

(72) Inventors: Kyungdae Park, Seoul (KR); Sungho Park, Seoul (KR); Youngsun Shin, Gyeonggi-do (KR); Saegee Oh, Gyeonggi-do (KR); Chaekyung Lee, Seoul (KR); Kyunghoon Han, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 254 days.

(21) Appl. No.: 13/685,822

(22) Filed: Nov. 27, 2012

(65) Prior Publication Data

US 2013/0139105 A1     May 30, 2013

(30) Foreign Application Priority Data

Nov. 28, 2011   (KR) .................. 10-2011-0124965

(51) Int. Cl.
*G06F 3/00* (2006.01)
*G06F 3/0481* (2013.01)
*G06F 9/44* (2006.01)
*G06F 3/0484* (2013.01)

(52) U.S. Cl.
CPC ............ *G06F 3/0481* (2013.01); *G06F 9/4443* (2013.01); *G06F 3/0484* (2013.01); *G06F 2203/04803* (2013.01)

(58) Field of Classification Search
CPC ... G06F 3/0481; G06F 3/0485; G06F 9/4443; G06F 3/0484; G06F 2203/04803
USPC .......................................................... 715/800
See application file for complete search history.

(56) References Cited

U.S. PATENT DOCUMENTS

| | | | | |
|---|---|---|---|---|
| 5,825,360 A | * | 10/1998 | Odam et al. ................... | 715/807 |
| 6,411,292 B1 | * | 6/2002 | Cook et al. .................... | 345/419 |
| 7,240,292 B2 | * | 7/2007 | Hally et al. ................... | 715/778 |
| 7,313,765 B2 | * | 12/2007 | Taylor et al. .................. | 715/788 |
| 7,350,154 B2 | * | 3/2008 | Anderson et al. ............. | 715/778 |
| 7,484,182 B1 | * | 1/2009 | Smith ........................... | 715/794 |
| 7,627,552 B2 | * | 12/2009 | Moore et al. .................. | 1/1 |
| 7,853,890 B2 | * | 12/2010 | Miner et al. .................. | 715/778 |
| 8,209,624 B2 | * | 6/2012 | Hally et al. ................... | 715/778 |
| 8,341,553 B2 | * | 12/2012 | Reed ............................. | 715/834 |
| 8,453,057 B2 | * | 5/2013 | Stallings et al. .............. | 715/726 |
| 8,473,859 B2 | * | 6/2013 | Chaudhri et al. ............. | 715/782 |
| 8,549,429 B2 | * | 10/2013 | Tsuruta et al. ................ | 715/810 |
| 8,745,535 B2 | * | 6/2014 | Chaudhri et al. ............. | 715/850 |
| 8,819,585 B2 | * | 8/2014 | Sareen et al. ................. | 715/804 |

* cited by examiner

*Primary Examiner* — David Phantana Angkool
(74) *Attorney, Agent, or Firm* — Cha & Reiter, LLC (57) ABSTRACT

A method and mobile device for displaying a supplementary window dependent on a main window include displaying the main window corresponding to a selected user function on a display unit, and receiving an input signal for invoking the supplementary window dependently associated with the main window. In response to the input signal, the device displays the supplementary window on the display unit such that at least a part of the supplementary window is connected to the main window.

18 Claims, 4 Drawing Sheets

METHOD AND MOBILE DEVICE FOR DISPLAYING SUPPLEMENTARY WINDOW

CLAIM OF PRIORITY

This application claims the benefit under 35 U.S.C. §119(a) of a Korean patent application filed on Nov. 28, 2011 in the Korean Intellectual Property Office and assigned Ser. No. 10-2011-0124965, the entire disclosure of which is hereby incorporated by reference.

BACKGROUND OF THE INVENTION

1. Field of the Invention

The present invention relates generally to a window display technology and, more particularly, to a method and mobile device for displaying a supplementary window to provide intuitively and, in a pleasing manner the supplementary window in which content dependent on a main window is displayed.

2. Description of the Related Art

Nowadays a variety of mobile devices have been popularized due to their portability, size, and multi-functionality. Additionally, many mobile devices can offer simultaneous multiple user functions. A user of such a mobile device can select and use a desired one of such user functions through a display unit that provides a screen associated with the selected user function.

In typical mobile devices, each user function may be generally associated with various screens (i.e., different display views or pages). Specifically, when there is a request for a particular user function, a mobile device outputs a main screen corresponding to the requested user function. If any item or link is then selected from the main screen, the mobile device outputs on the display unit a new screen corresponding to the selected item or link. Namely, the main screen is replaced with the new screen. Therefore, as time passes, a user may easily forget a dependent relation between the current screen and the previous screen. Further, since a typical mobile device merely offers a change in screen, it may not satisfy a user's various needs.

BRIEF SUMMARY OF THE INVENTION

Accordingly, the present invention addresses the above-mentioned problems and/or disadvantages and offers at least the advantages described below.

One aspect of the present invention is to provide a method and mobile device for displaying a supplementary window together with a pleasing and attractive display effect.

Another aspect of the present invention is to provide a method and mobile device for displaying a supplementary window such that a user can be easily and continuously made aware of dependency of the supplementary window on a main window.

According to one aspect of the present invention, provided is a method for displaying a supplementary window, the method comprising the steps of: displaying a main window corresponding to a selected user function on a display unit; receiving an input signal for invoking a supplementary window dependently associated with the main window; and displaying the supplementary window on the display unit in response to the input signal such that at least a part of the supplementary window is connected to the main window.

According to another aspect of the present invention, provided is a mobile device for supporting a supplementary window display, the device comprising: a display unit configured to display a main window corresponding to a selected user function; at least one of an input unit, a touch panel, and a sensor unit configured to create an input signal for invoking the supplementary window dependently associated with the main window; and a control unit configured to receive the input signal and to control displaying the supplementary window on the display unit such that at least a part of the supplementary window is connected to the main window.

The above method and mobile device for displaying a supplementary window may not only effectively express a dependent relation between the supplementary window and the main window, but also offer a supplementary window with a pleasing and attractive appearance.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF THE INVENTION

Exemplary, non-limiting embodiments of the present invention will now be described more fully with reference to the accompanying drawings. This invention may, however, be embodied in many different forms and should not be construed as being limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

For the purposes of clarity and simplicity, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
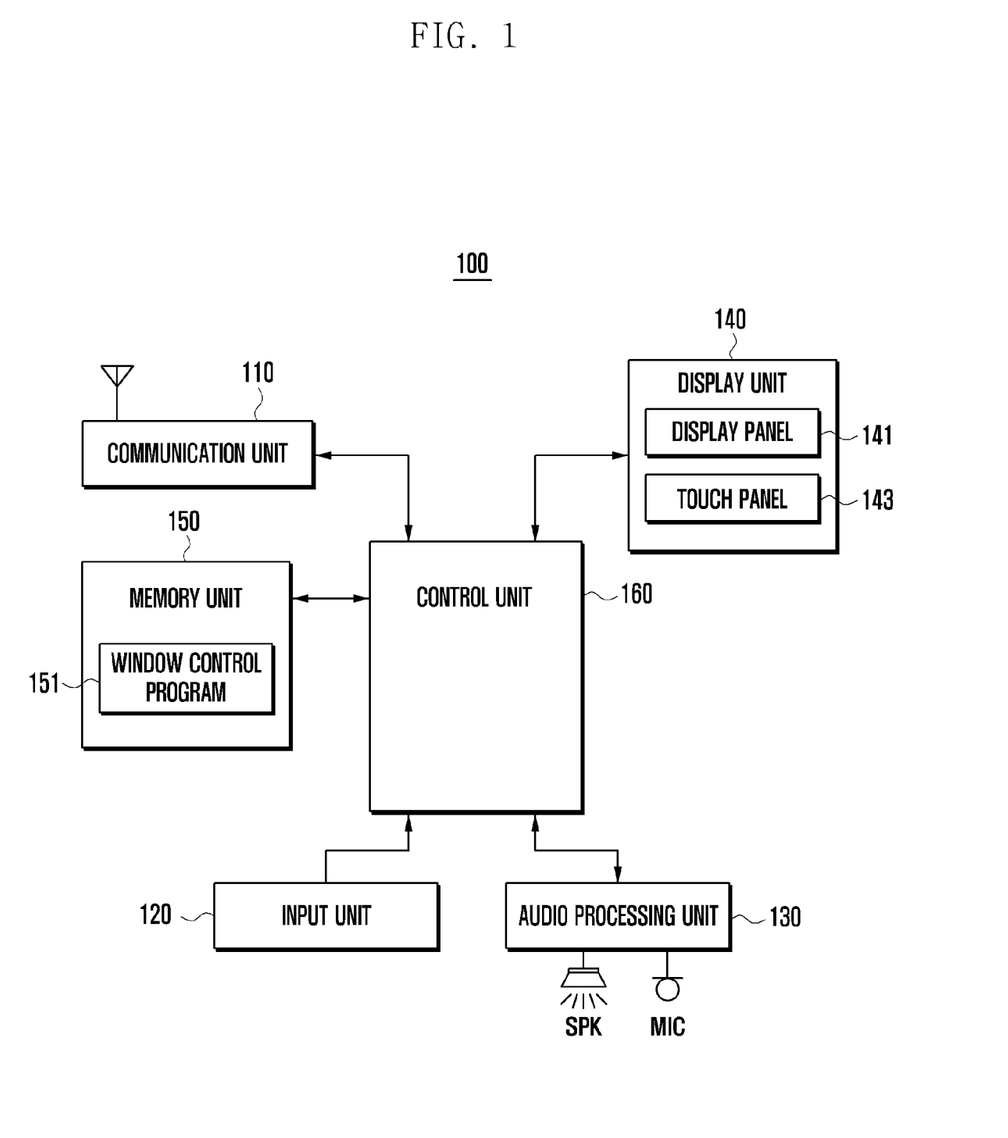
FIG. 1 is a block diagram illustrating the configuration of a mobile device for supporting a supplementary window display function in accordance with an embodiment of the present invention.

FIG. 1 is a block diagram illustrating the configuration of a mobile device for supporting a supplementary window display function in accordance with an embodiment of the present invention.

Referring to FIG. 1, the mobile device 100 of this embodiment may include a communication unit 110, an input unit 120, an audio processing unit 130, a display unit 140, a memory unit 150, and a control unit 160.

When a supplementary window dependent on a main window is invoked while the main window is being displayed on the display unit 140, the mobile device 100 may support a display of the supplementary window together with variations in display for allowing a user to intuitively recognize a relation between the supplementary window and the main window. Namely, the mobile device 100 may not only effectively express a dependent relation between the supplementary window and the main window, but also may offer an intuitive, pleasing and attractive display effect for the appearance of the supplementary window. In this disclosure, a main window refers to a display view or page outputted on the display unit 140 and may be composed of various data and software frameworks of various sizes and types. Additionally, a supplementary window refers to a secondary window dependent on a main window and may offer subsidiary various functions or information associated with the main window. Like the main window, the supplementary window may be composed of various data and software frameworks regardless of size and type. Further, the supplementary window may have a sub-supplementary window, acting as a main window for the supplementary window.

The communication unit 110 is configured to support a communication function of the mobile device 100. If the mobile device 100 does not support a communication function, the communication unit 110 may be omitted from the mobile device 100. The communication unit 110 may be equipped in the form of mobile communication module so as to support a mobile communication function of the mobile device 100. Therefore, the communication unit 110 establishes a communication channel with a mobile communication system and thereby supports signal transmission and reception for a mobile communication function of the mobile device 100. For example, the communication unit 110 may form at least one of a voice service channel, a video service channel, and a data service channel, with a mobile communication system. Further, the communication unit 110 may support transmission and reception of specific signals associated with a selected service channel. Particularly, the communication unit 110 supports a function associated with the output of various windows.

For example, the communication unit 110 may support some functions for outputting a main window that corresponds to a dialing screen and for outputting a supplementary window that corresponds to a phonebook screen in the dialing screen. Further, the communication unit 110 may support some functions for outputting a main window associated with a web access and for outputting a supplementary window in response to a selection of link on a web access screen. Particularly, the communication unit 110 may establish a communication channel with other devices and external network and then support data transmission and reception based on the communication channel. This data may be outputted on at least one of the main window and the supplementary window and also stored in the memory unit 150.

The input unit 120 is configured to create various input signals required for operation of the mobile device 100. The input unit 120 may be composed of various input devices such as a keyboard, a keypad, and/or key buttons. If the display unit 140 is provided as a touch screen, the input unit 120 may be constructed in the form of touch map outputted on the touch screen. The input unit 120 may create input signals associated with a supplementary window display function in response to a user's manipulation. For example, the input unit 120 may create various input signals for invoking a supplementary window while a main window is outputted on the display unit 140. Additionally, the input unit 120 may create input signals for outputting a sub-supplementary window dependent on a supplementary window while the supplementary window is being outputted. Such input signals for invoking a supplementary window or a sub-supplementary window may include at least one of an input signal for selecting one of menu or link items on a main window, a specific key button signal, a hot key input signal, a soft key selection signal, and a specific sensor signal. For this arrangement, the mobile device 100 may further have a sensor unit for supporting sensor signals.

The audio processing unit 130 may output audio data associated with operation of the mobile device, audio data associated with playback of audio files stored in the memory unit 150, audio data received from the outside. Also, the audio processing unit 130 may support a function of acquiring audio data. For this arrangement, the audio processing unit 130 may include a speaker (SPK) and a microphone (MIC). Particularly, the audio processing unit 130 may output predefined sound effects or guide sounds during a display of a main window, a supplementary window or a sub-supplementary window. Additionally, the audio processing unit 130 may output sound effects corresponding to variations in display of a supplementary window or a sub-supplementary window.

The display unit 140 is configured to offer various screen interfaces required for operation of the mobile device 100. For example, the display unit 140 supports an idle screen, a menu screen, and other screens. Particularly, the display unit 140 may output one of a screen on which a main window is displayed, a screen on which a supplementary window is displayed in a state where a main window is already displayed, and a screen on which a sub-supplementary window is displayed in a state where a main window and a supplementary window are already displayed. When a supplementary window is displayed, a predetermined display effect that indicates a dependent relation with a main window may be offered together. If a new screen irrelative to a main window is displayed in a state where a main window is already being displayed, the main window may be replaced with the new screen. Examples of screen interfaces associated with a display of a supplementary window will be described later.

The display unit 140 may be constructed in the form of touch screen in which a display panel 141 and a touch panel 143 are stacked. On the display panel 141, various images and text constituting the above-discussed screens may be displayed. The touch panel 143 may have a touch valid region and a touch invalid region defined according to characteristics of the screen outputted on the display panel 141, and may also deliver a touch event occurring in the touch valid region to the control unit 160. Particularly, when a main window is displayed on the display panel 141, the touch panel 143 may have touch valid regions corresponding to link items on the main window. Also, when a supplementary window is displayed, the touch panel 143 may have touch valid regions corresponding to link items or any other items associated with a function selection on the supplementary window. And also, when a sub-supplementary window is displayed, the touch panel 143 may have touch valid regions in the same manner as in a supplementary window. The touch panel 143 may create a touch event for invoking a supplementary window or a sub-supplementary window at a user's request.

When a part of a main window is disposed as a lower layer under a supplementary window displayed on the main window, the touch panel 143 may inactivate a touch function for the underlying part of the main window. Similarly, when a sub-supplementary window is displayed on a supplementary window, the touch panel 143 may define as touch invalid region a part of the supplementary window or main window hidden by the sub-supplementary window.

A supplementary window display function based on the display unit 140 will be described in detail later.

The memory unit 150 may store various operating systems required for operation of the mobile device 100, and data, applications and algorithms associated with various user functions. Particularly, the memory unit 150 may store a window control program 151 for supporting a supplementary window display function.

The window control program 151 defines a variety of routines for supporting a supplementary window display function. For example, while a main window is displayed on the display unit 140 so as to support a selected user function, the window control program 151 may have a check routine for determining whether an input signal for invoking a supplementary window occurs, and a display routine for offering a display effect to show a dependent relation between a main window and a supplementary window in response to the above input signal.

Specifically, the check routine is to determine whether any input signal is used to invoke a supplementary window dependent on a main window. This input signal may include a touch signal for selecting an item and a sensor signal, e.g., an acceleration sensor signal, for indicating a tilt or change in direction. If such an input signal occurs during a display of a main window, the check routine may check a characteristic list of input signals predefined in the memory unit 150 so as to determine whether the input signal corresponds to a signal for invoking a supplementary window.

The display routine is to display a supplementary window on the display unit 140 as being partially connected to a main window so as to show a dependent relation between the main window and the supplementary window. The display routine may have display information about both the main window and the supplementary window and may support a display in an interconnected form by checking location information about both windows.

The control unit 160 is configured to control a flow of various signals and their acquisition and outputting of information so as to support a supplementary window display function. The control unit 160 may not only support a display of a supplementary window while a main window is displayed, but also control a display effect associated with a dependent relation between the main window and the supplementary window. The control unit 160 may have a configuration shown in FIG. 2 for implementing this feature.

Figure 2:
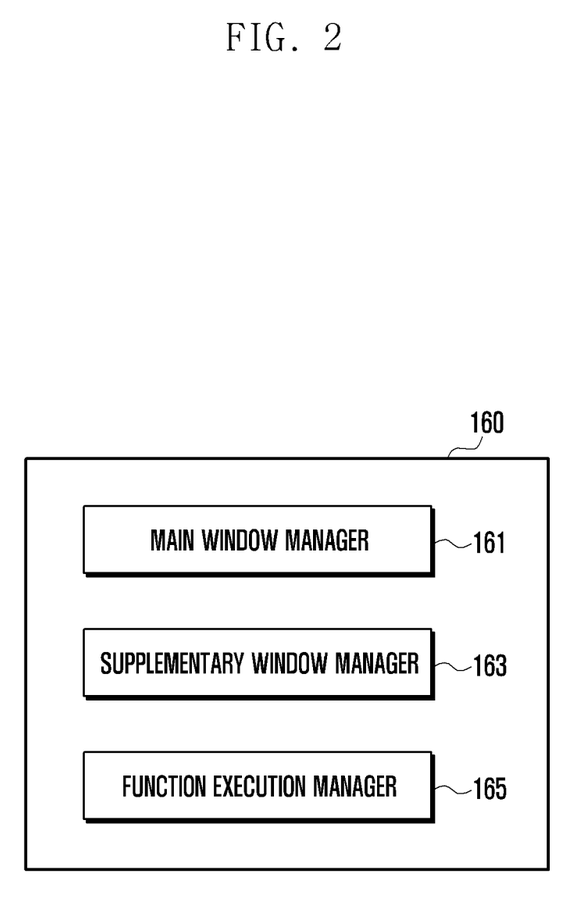
FIG. 2 is a block diagram illustrating a detailed configuration of a control unit shown in FIG. 1.

FIG. 2 is a block diagram illustrating a detailed configuration of a control unit as shown in FIG. 1.

Referring to FIG. 2, the control unit 160 may include a main window manager 161, a supplementary window manager 163, and a function execution manager 165.

The main window manager 161 may check whether an input signal for activating a selected user function is received from the input unit 120 or the touch panel 143. If such an input signal is received, the main window manager 161 may support a display of a main window on the display unit 140. Here, many user functions may be associated with a display of a main window. Examples of user functions include, a menu screen function, an idle screen function, a call function, a file play function, a file search function, a broadcast receiving function, a web access function, a game function, and a scheduler function. When there is an input signal for selecting a particular one of the above user functions, the main window manager 161 may control the selected user function to be activated in response to the input signal. Then the main window manager 161 may support a display of a main window on the display unit 140. Therefore, a main window may be a specific screen associated with the selected function.

When a specific input signal occurs in a state where a main window is displayed on the display unit 140, the supplementary window manager 163 checks whether the input signal is for outputting a supplementary window dependent on the main window. Then, in response to the input signal, the supplementary window manager 163 may support a display of a supplementary window corresponding to the input signal on the display unit 140. In this case, an input signal for outputting a supplementary window may include an input signal for selecting one of various link or menu items on a main window, and any other input signal for invoking a supplementary window such as a touch signal or a sensor signal. When one of the above input signals is received, the supplementary window manager 163 that supports a supplementary window corresponding to the input signal is displayed on the display unit 140. In this step, the supplementary window manager 163 may support any display effect, e.g., a connected form of both windows, is offered so as to indicate a dependent relation between a main window and a supplementary window. Additionally or alternatively, the supplementary window manager 163 may offer a more attractive display effect for indicating a dependent relation. For example, a supplementary window may be gradually displayed as if rotated. Also, a main window may be varied in a display form according to a change in a display form of a supplementary window.

The function execution manager 165 is configured to support a display of a sub-supplementary window on the display unit 140 in response to an input signal received after a supplementary window is displayed, or to support the execution of a particular function in response to any other input signal. If an input signal for returning to a main window is received, the function execution manager 165 may support a display of only a main window by removing a supplementary window from the display unit 140. In this step, the function execution manager 165 may offer a display effect as if a supplementary window is gradually removed in reverse order in comparison with the above-discussed display effect for displaying a supplementary window. Meanwhile, when any input signal irrelative to a supplementary window is received, the function execution manager 165 may control operation of a particular user function related to the received input signal.

As discussed above, the mobile device 100 may provide more intuitive relation information between windows to a user by offering a graphical display effect for a dependent relation between a main window and a supplementary window when the supplementary window is displayed. Additionally, the mobile device 100 may allow a user to easily recognize related information by performing a user pleasing display control during a display of a supplementary window.

Figure 3:
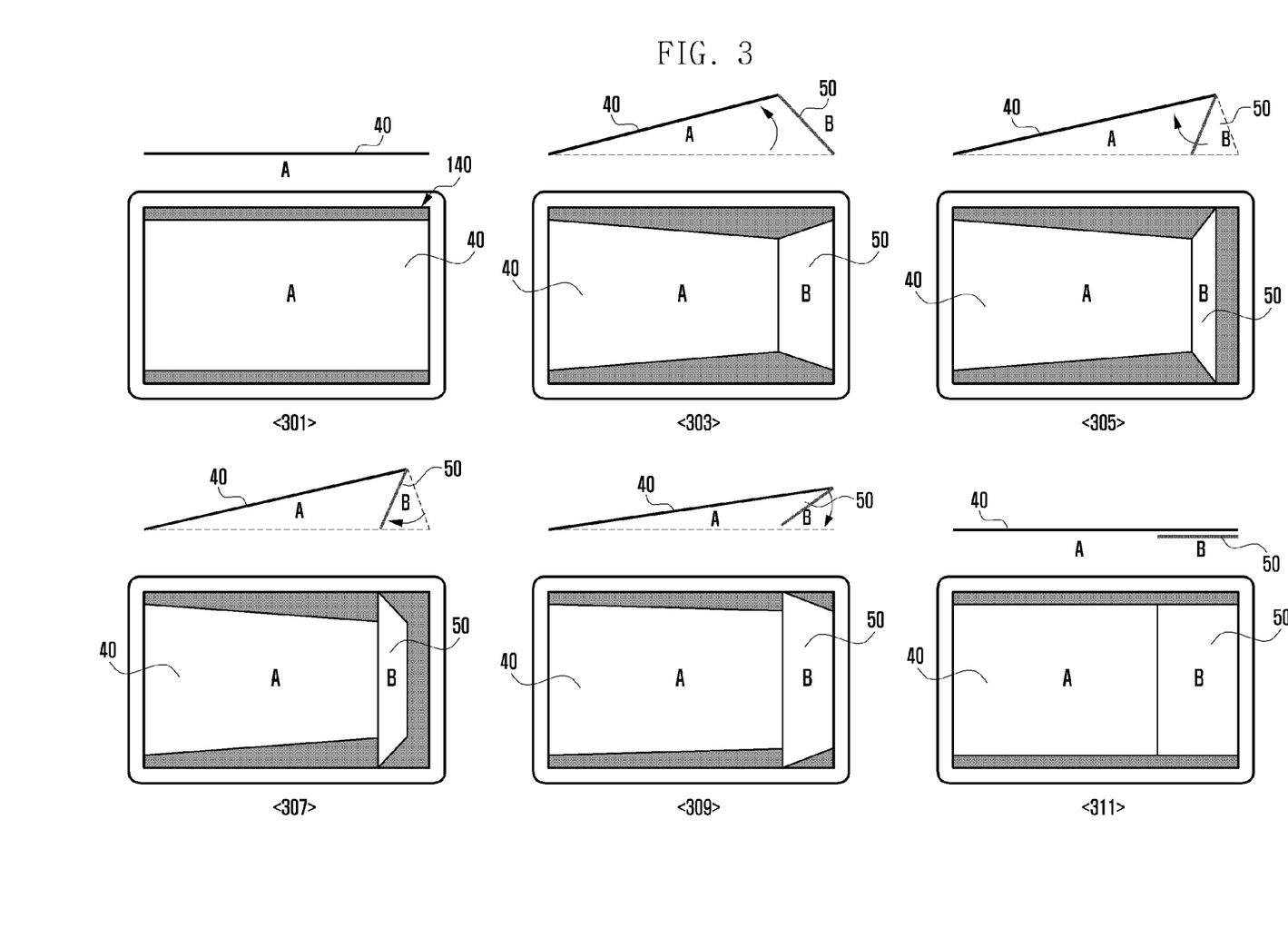
FIG. 3 shows a screen interface illustrating a supplementary window display function in accordance with an embodiment of the present invention.

FIG. 3 shows a screen interface illustrating a supplementary window display function in accordance with an embodiment of the present invention. The particular windows shown by display unit 140 within the screens of FIG. 3 all are described in the context of a spatial coordinate system characterized by three axes, viz., an X-axis, a Y-axis and a Z-axis. Referring to FIG. 3, it can be understood that the X-axis is defined as any path that is parallel to the longer sides of the screens 301, 303, 305, 307, 309 and 311. The Y-axis is defined as any path that is parallel to the shorter sides of the screens. The X-axis is understood to be perpendicular to the Y-axis. The Y-axis thus intersects the X-axis to form an X-Y plane. The above-identified screens lie in at least a portion of the X-Y plane. A Z-axis is any path that is perpendicular to the X-Y plane. One can describe motion along the Z-axis as inward motion or outward motion; that is movement inward from the X-Y plane of the screen or movement outward from the X-Y plane of the screen. Thus, outward motion is motion towards a user positioned in front of the screen. Inward motion is motion away from the user positioned in front of the screen. It will be understood, however, that inward or outward motion or any motion or window that uses at least part of the Z-axis does so based on a well known visual illusion in which three-dimensional objects are perceived visually as existing in three dimensional space whereas they actually lie in a two dimensional space. Thus, motion and position within a visually perceived three-dimensional space on a two-dimensional screen is understood in the descriptions that follow with respect to FIG. 3. Note that above each of the screens shown in FIG. 3 is a top view drawing of the window and supplementary window being displayed by display unit 140. Some of these top view drawings contain an arrow showing the direction of rotation of a supplementary window with respect to a main window.

Referring to FIGS. 1 and 3, a user may enter an input signal for selecting a particular one of user functions supported by the mobile device 100, and thus the control unit 160 of the mobile device 100 may activate the selected user function in response to the input signal. At the same time, the control unit 160 may output on the display unit 140 a main window 40 corresponding to the selected user function as shown in a screen 301. In this step, the control unit 160 may output the main window 40 on the whole of the display unit 140. Although the main window 40 is disposed in a landscape mode (i.e., a horizontal display mode) as shown; this is exemplary only and not to be considered as a limitation to the invention.

In a state of the screen 301 where the main window 40 is outputted, a user may enter an input signal for invoking a supplementary window that has a dependent relation with the main window 40. For example, a user may produce a flick event to the left on the display unit 140 that outputs the main window 40 in the screen 301. Alternatively, a user may tilt the mobile device 100 such that the mobile device 100 moves into a sloping position with the right end higher than the other end. Alternatively, a user may enter any other input signal predefined for invoking a supplementary window.

Then the control unit 160 may output on the display unit 140 a supplementary window 50 as shown in a screen 303. In this step, in order to indicate that the supplementary window 50 is dependently associated with the main window 40, the control unit 160 may offer a particular display effect showing as if the supplementary window 50 and the main window 40 meet at their one edge and also the supplementary window 50 gradually appears on the display unit 140.

For this, as shown in a screen 303, the control unit 160 may control a display effect as if at least parts of the main window 40 slope downward in the Z-axis direction of the display unit 140, namely slope inward from the screen, and also the supplementary window connected to the main window 40 slopes inward from the screen. Here, the content displayed in the main window 40 may be the same as that in case of the screen 301. While the front side of the display unit 140 is defined using a combination of the X-axis and the Y-axis, the Z-axis direction may indicate an inward or outward direction from the screen. Namely, even though illustrated examples show graphical structures sloped inward in the Z-axis direction, other graphical structures sloped outward in the Z-axis direction may also be possible in the screen 303.

The supplementary window 50 shown in the screen 303 substantially corresponds to the rear side of the supplementary window 50; that is, the rear side of a page to be outputted on the supplementary window 50 as will be discussed later.

As shown in next screens 305, 307, 309 and 311, the control unit 160 may control a display effect as if the supplementary window 50 rotates about the boundary with the main window 40 i.e., rotate about their connected edges). In these steps, the size of the supplementary window 50 is gradually decreased while a rotation angle is less than 90 degrees, but is gradually increased after a rotation angle exceeds 90 degrees. Further, the rear side of the supplementary window 50 is displayed at a rotation angle less than 90 degrees, and the front side of the supplementary window 50 is displayed at a rotation angle more than 90 degrees.

The supplementary window 50 may have an opaque form. Therefore, when the supplementary window 50 overlaps with the main window 40 as shown in the screens 307, 309 and 311, the supplementary window 50 may hide overlapped portions of the main window 40. Alternatively, the supplementary window 50 may have a transparent form. In such a case, even though the supplementary window 50 overlaps with the main window 40 as shown in the screens 307, 309 and 311, overlapped portions of the main window 40 may be shown through the supplementary window 50.

The content displayed on the supplementary window 50 in the screens 303 and 305 may be the same as that in screens 307 and 309. Alternatively, the contents may be displayed in a reversed form on the supplementary window 50 in screens 303 and 305, and then return to an original form in the screens 307 and 309.

The control unit 160 may resize the main window 40 or a content region of the main window 40 such that the contents displayed on the main window 40 may not be hidden by the supplementary window 50. This resizing process may be continuously or sequentially performed during a rotation of the supplementary window 50 or performed just once at the end of rotation, namely in the screen 311.

Additionally, the supplementary window 50 may be displayed in a particular screen form on the main window 40, based on user's setting or designer's intention. For example, a process of displaying the supplementary window 50 may provide only the above-discussed screen 303 that shows a connection of the main window 40 and the supplementary window 50. Therefore, from a display effect, which appears three-dimensional, a user can be easily aware of a dependent relation between two windows. Alternatively, a process of displaying the supplementary window 50 may provide, as an independent screen, each of the above-discussed screens 305, 307 and 309. Namely, the supplementary window 50 may not only be displayed as an overlay form after rotation, but also be displayed in the form of a still frame in rotation.

Figure 4:
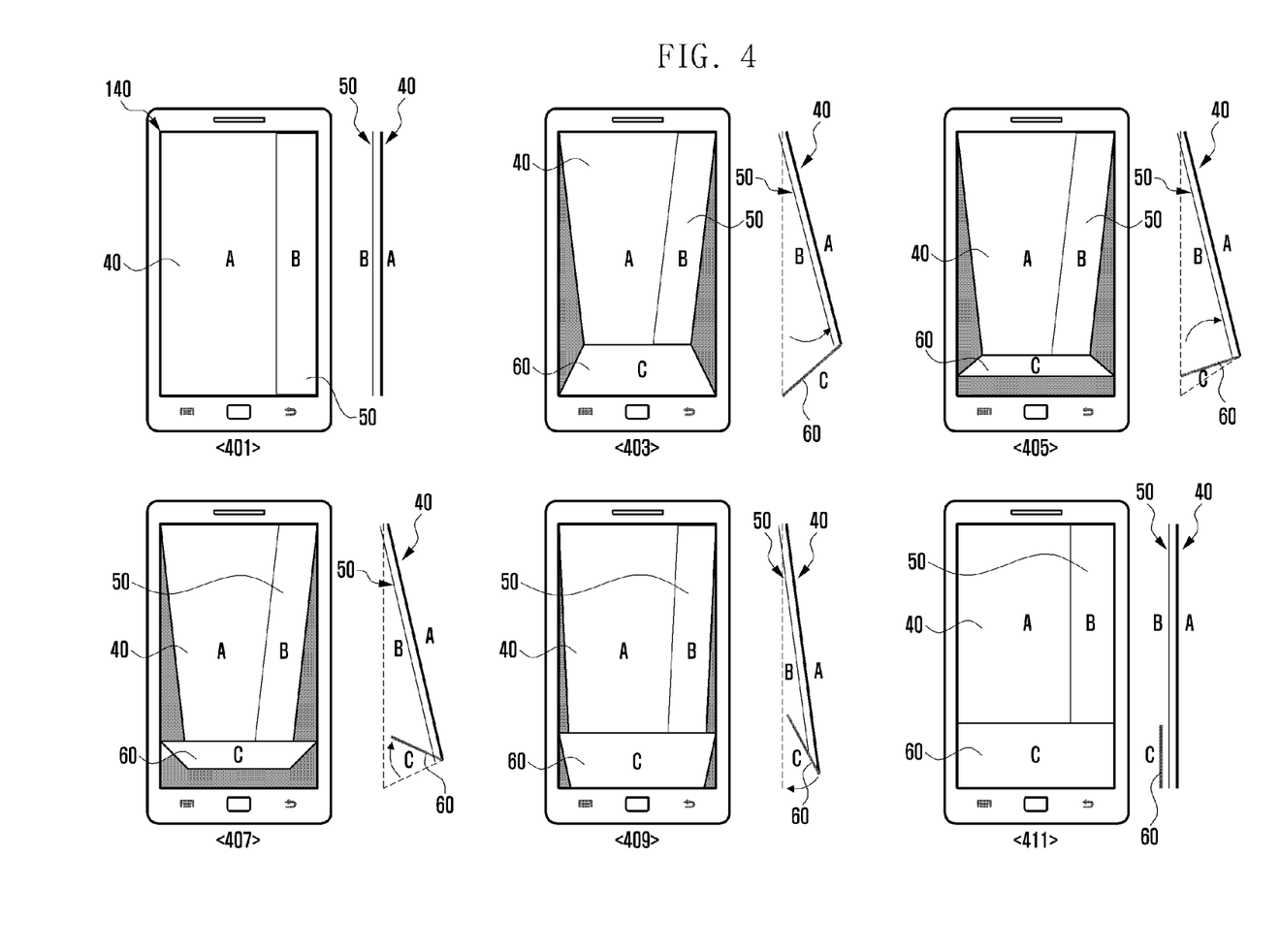
FIG. 4 shows a screen interface illustrating a sub-supplementary window display function in accordance with an embodiment of the present invention.

FIG. 4 shows a screen interface illustrating a sub-supplementary window display function in accordance with an embodiment of the present invention. Although a main window and a supplementary window are disposed in a portrait mode (i.e., a vertical display mode) as shown, this is exemplary only and not to be considered as a limitation of the invention. Namely, the main window and the supplementary window may be displayed through any display effect for indicating a dependent relation regardless of their orientation.

Referring now to FIG. 4, as with FIG. 3, the particular windows shown by display unit 140 within the screens of FIG. 4 all are described in the context of a spatial coordinate system characterized by three axes, viz., an X-axis, a Y-axis and a Z-axis. In FIG. 4, it can be understood that the X-axis is defined as any path that is parallel to the shorter sides of the screens 401, 403, 405, 407, 409 and 411. The Y-axis is defined as any path that is parallel to the longer sides of the screens. The X-axis is understood to be perpendicular to the Y-axis. The Y-axis intersects the X-axis to form an X-Y plane. The above-identified screens lie in at least a portion of the X-Y plane. A Z-axis is any path that is perpendicular to the X-Y plane. One can describe motion along the Z-axis as inward motion or outward motion; that is movement inward from the X-Y plane of the screen or movement outward from the X-Y plane of the screen. Thus, outward motion is motion towards a user positioned in front of the screen. Inward motion is motion away from the user positioned in front of the screen. It will be understood, however, that inward or outward motion or any motion or window that uses at least part of the Z-axis does so based on a well known visual illusion in which three-dimensional objects are perceived visually as existing in three dimensional space whereas they actually lie in a two dimensional space. Thus, motion and position within a visually perceived three-dimensional space on a two-dimensional screen is understood in the descriptions that follow with respect to FIG. 4. Note that to the right of each of the screens shown in FIG. 4 is a top view drawing of the window, supplementary window and/or sub-supplementary window being displayed by display unit 140. Some of these top view drawings contain an arrow showing the direction of rotation of a supplementary window with respect to a main window or direction of rotation of a sub-supplementary window with respect to a main window and a supplementary window.

Still referring to FIG. 4, a user may enter an input signal for selecting a particular one of user functions and activating the selected user function in the mobile device 100. Then the control unit 160 may activate the selected user function in response to the input signal and support a display of a main window 40 corresponding to the selected user function on the display unit 140.

Additionally, when an input signal for outputting a supplementary window is received, the control unit 160 may support a display of the supplementary window 50 on the display unit 140. Here, as shown in a screen 401, the supplementary window 50 may be displayed together with the main window 40 in a portrait mode on the display unit 140. For example, the supplementary window 50 may be disposed on the right of the main window 40 as shown. Further, as discussed earlier in FIG. 3, the supplementary window 50 may be gradually displayed by means of a display effect that shows a dependent relation between the main window 40 and the supplementary window 50.

A user may select one of the functions on the supplementary window 50 so as to output a sub-supplementary window 60. When one of a plurality of items is selected from the supplementary window 50, the control unit 160 may check whether the selected item corresponds to an input signal for invoking the sub-supplementary window 60. If so, the control unit 160 may control a process of invoking the sub-supplementary window 60.

For example, the control unit 160 may support a display such that one edge of the sub-supplementary window 60 is connected to one edge of both the main window 40 and the supplementary window 50. For this, as shown in a screen 403, the control unit 160 may control a display effect as if both windows 40 and 50 slope inward from the screen and also the sub-supplementary window 60 slopes inward from the screen.

Additionally, as shown in next screens 405, 407, 409 and 411, the control unit 160 may control a display effect as if the sub-supplementary window 60 rotates about the boundary with both windows 40 and 50. After rotation, the sub-supplementary window 60 may be displayed on both the main window 40 and the supplementary window 50 as shown in the final screen 411.

Like the supplementary window 50 discussed above, the sub-supplementary window 60 may have an opaque form or a transparent form. Therefore, in case of an opaque form, the sub-supplementary window 60 may hide underlying portions of both windows 40 and 50. However, in case of a transparent form, the sub-supplementary window 60 allows underlying portions of both windows 40 and 50 to be shown to the outside.

As discussed heretofore, the mobile device 100 may display the supplementary window 50 or the sub-supplementary window 60 such that a dependent relation with the main window 40 or with the supplementary window 50 can be intuitively recognized with a seamless display effect.

If there is an input signal for returning to the main window 40 or the supplementary window 50, the supplementary window 50 or the sub-supplementary window 60 may be removed from the display unit 140 in reverse order in comparison with displaying order. Namely, with respect to FIG. 3, the supplementary window 50 may be rotated in order of screens 309, 307, 305 and 303 and then finally removed from the screen 301. Similarly, for FIG. 4, the sub-supplementary window 60 may be rotated in order of screens 409, 407, 405 and 403 and then finally removed from the screen 401. Additionally, each of the supplementary window 50 and the sub-supplementary window 60 may become transparent gradually during rotation.

Referring back to FIG. 3, the control unit 160 may resize the main window 40 and the supplementary window 50 or a content region of each window 40 and 50. Specifically, when the main window 40 is partially hidden by the supplementary window 50 as shown in the above-discussed screens 305, 307, 309 and 311, the control unit 160 may resize the entire main window 40 or a content region only thereof such that the content displayed therein may be fully shown. Similarly, for FIG. 4, when the main window 40 and the supplementary window 50 are partially hidden by the sub-supplementary window 60 as shown in the above-discussed screens 405, 407, 409 and 411, the control unit 160 may resize the main window 40 and the supplementary window 50 themselves or each content region only thereof such that the content displayed therein may be fully shown. This resizing process may be performed after rotation. Namely, the control unit 160 may perform a resizing process for the main window 40 and the supplementary window 50 at the final screen 411 only.

Like the supplementary window 50 discussed earlier, the sub-supplementary window 60 may be displayed in a particular screen form, i.e., one of the screens 403, 405, 407 and 409, on the display unit 140. For example, a process of displaying the sub-supplementary window 60 may provide only the above-discussed screen 403 that shows a dependent relation among the main window 40, the supplementary window 50 and the sub-supplementary window 60.

As fully discussed above, when a supplementary window dependent on a main window is invoked while the main window is being displayed, the mobile device having a supplementary window display function may display the supplementary window in the form of being connected to the main window. Particularly, the mobile device may provide a more visualized display process to intuitively indicate that the supplementary window is dependently associated with the main window.

The above-discussed main window may correspond to a particular screen of selected user function such as a menu screen function, an idle screen function, a call function, a file play function, a file search function, a broadcast receiving function, a web access function, a game function, a scheduler function, or the like. If the main window is a menu screen related to a menu screen function, the supplementary window may be a menu setting screen that allows adding, deleting, rearranging, etc. menu items. In this case, the sub-supplementary window may be a text screen that describes in detail setting items in the supplementary window.

Additionally, if the main window is a broadcast receiving screen related to a broadcast receiving function, the supplementary window may be a broadcast channel selection screen that allows a selection of broadcast channels. In this case, the sub-supplementary window may be a channel descriptive screen of a selected channel in the supplementary window or a channel setting screen for adjusting the setting of broadcast channel selection screen. Also, if the main window is a calendar screen related to a scheduler function, the supplementary window may be a schedule list of this month. In this case, the sub-supplementary window may be a screen showing the details of each schedule.

As discussed above, a main window, a supplementary window, and a sub-supplementary window may be displayed in interconnected or dependently associated forms. Each of the supplementary window and the sub-supplementary window may have a smaller size than its higher-rank window, namely the main window or the supplementary window.

Although in the above-discussed embodiment the supplementary window rotates in a specific direction on the boundary with the main window, this is exemplary only and not to be considered as a limitation of the invention. Alternatively, the supplementary window may rotate in any direction on any point of the main window. This rotation scheme for the supplementary window may be varied according to a user's setting. The same may apply to the sub-supplementary window.

The above-discussed mobile device 100 may essentially or selectively include any other elements. For instance, the mobile device 100 may further include a short range communication module, a digital camera module, a wired or wireless data transmission interface, an Internet access module, a digital broadcast receiving module, and so forth. According to a digital convergence tendency today, such elements may be varied, modified and improved in various ways, and any other elements equivalent to the above elements may be additionally or alternatively equipped in the mobile device 100. Meanwhile, as will be understood by those skilled in the art, some of the above-mentioned elements in the mobile device 100 may be omitted or replaced with another.

Additionally, the mobile device 100 of this invention may include any type of electronic devices. For instance, the mobile device 100 may include mobile communication devices, multimedia players and their application equipment, especially including many mobile communication terminals based on various communication protocols, a portable multimedia player (PMP), a digital broadcasting player, a personal digital assistant (PDA), a music player (e.g., an MP3 player), a portable game console, a smart phone, a notebook, a handheld personal computer, etc.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for displaying a supplementary window, the method comprising:
    displaying a main window corresponding to a selected user function on a display unit;
    receiving an input signal for invoking the supplementary window dependently associated with the main window;
    displaying the supplementary window on the display unit in response to the input signal such that at least a part of the supplementary window is coupled to the main window;
    rotating the supplementary window relative to the main window about a connected edge between the supplementary window and the main window; and
    disposing the supplementary window on the main window in an overlapped form after rotation.

2. The method of claim 1, wherein the displaying the supplementary window comprises:
    allowing one edge of the main window to slope downward in a Z-axis direction of the display unit; and
    outputting the supplementary window on the display unit such that one edge of the supplementary window is connected to a sloping edge of the main window.

3. The method of claim 2, wherein the supplementary window has one of an opaque form and a transparent form.

4. The method of claim 2, wherein the displaying the supplementary window further comprises:
    resizing the main window or a content region of the main window such that content displayed on the main window is not hidden by the supplementary window.

5. The method of claim 1, further comprising:
    receiving an input signal for selecting one of a plurality of items in the supplementary window or for invoking a sub-supplementary window dependently associated with the supplementary window; and
    displaying a sub-supplementary window on the display unit such that at least a part of the sub-supplementary window is connected to the supplementary window.

6. The method of claim 5, wherein the displaying the sub-supplementary window comprises the steps of:
    allowing one edge of each of the main window and the supplementary window to slope downward in a Z-axis direction of the display unit;
    outputting the sub-supplementary window on the display unit such that one edge of the sub-supplementary window is connected to the sloping edge of the main window and the supplementary window;
    rotating the sub-supplementary window about the connected edges; and
    disposing, on the main window, the sub-supplementary window and the supplementary window in an overlapped form after rotation.

7. The method of claim 6, wherein the sub-supplementary window has one of an opaque form and a transparent form.

8. The method of claim 6, wherein the displaying the supplementary window further comprises:
   resizing the main window and the supplementary window or content regions thereof such that contents displayed in the main window and the supplementary window are not be hidden by the sub-supplementary window.

9. An electronic device for supporting a supplementary window display, comprising:
   a display unit configured to display a main window corresponding to a selected user function;
   at least one of an input unit, a touch panel, and a sensor unit configured to create an input signal for invoking the supplementary window dependently associated with the main window; and
   a control unit configured to:
   receive the input signal and to control display the supplementary window on the display unit such that at least a part of the supplementary window is coupled to the main window in response to the received input signal,
   rotate the supplementary window about a connected edge between the supplementary window and the main window, and
   dispose the supplementary window on the main window in an overlapped form after rotation.

10. The electronic device of claim 9, wherein the control unit is further configured to allow one edge of the main window to slope downward in a Z-axis direction of the display unit, and to output the supplementary window on the display unit such that one edge of the supplementary window is connected to a sloping edge of the main window.

11. The electronic device of claim 9, wherein the supplementary window has one of an opaque form and a transparent form.

12. The electronic device of claim 9, wherein the control unit is further configured to resize the main window or a content region of the main window such that content displayed on the main window is not hidden by the supplementary window.

13. The electronic device of claim 9, wherein the control unit is further configured to receive an input signal for selecting one of a plurality of items in the supplementary window, for invoking a sub-supplementary window dependently associated with the supplementary window, and to control displaying the sub-supplementary window on the display unit such that at least a part of the sub-supplementary window is connected to the supplementary window.

14. The electronic device of claim 10, wherein the control unit is further configured to allow one edge of each of the main window and the supplementary window to slope downward in the Z-axis direction of the display unit, and to output a sub-supplementary window on the display unit such that one edge of the sub-supplementary window is connected to a sloping edge of the main window and the supplementary window.

15. The electronic device of claim 14, wherein the control unit is further configured to rotate the sub-supplementary window about the connected edges, and to dispose the sub-supplementary window on the main window and the supplementary window in an overlapped form after rotation.

16. The electronic device of claim 15, wherein the sub-supplementary window has one of an opaque form and a transparent form.

17. The electronic device of claim 15, wherein the control unit is further configured to resize the main window and the supplementary window and content regions thereof such that contents displayed on the main window and the supplementary window are not hidden by the sub-supplementary window.

18. The electronic device of claim 9, wherein the input signal includes at least one of an input signal for selecting one of menu or link items on the main window, a specific key button signal, a hot key input signal, a soft key selection signal, and a specific sensor signal.

* * * * *

UNITED STATES PATENT AND TRADEMARK OFFICE
CERTIFICATE OF CORRECTION

| | | |
|---|---|---|
| PATENT NO. | : 9,046,986 B2 | Page 1 of 1 |
| APPLICATION NO. | : 13/685822 | |
| DATED | : June 2, 2015 | |
| INVENTOR(S) | : Kyungdae Park et al. | |

It is certified that error appears in the above-identified patent and that said Letters Patent is hereby corrected as shown below:

In the Claims

Column 13, Claim 8, Line 8 should read as follows:
--...not hidden by the...--

Column 13, Claim 9, Line 18 should read as follows:
--...control display of the...--

Signed and Sealed this
Fifteenth Day of September, 2015

Michelle K. Lee
*Director of the United States Patent and Trademark Office*